United States Patent
Dombroskie et al.

(10) Patent No.: US 6,575,482 B2
(45) Date of Patent: Jun. 10, 2003

(54) PULL CART

(76) Inventors: Daniel F. Dombroskie, 27 Baylor Blvd., Lewisburg, PA (US) 17837; Michael Hrapowicki, 107 Wagner St., McEwensville, PA (US) 17749

( * ) Notice: Subject to any disclaimer, the term of this patent is extended or adjusted under 35 U.S.C. 154(b) by 0 days.

(21) Appl. No.: 09/912,205

(22) Filed: Jul. 24, 2001

(65) Prior Publication Data
US 2003/0020250 A1 Jan. 30, 2003

(51) Int. Cl.[7] .................................................. B62B 1/00
(52) U.S. Cl. ..................................... 280/47.24; 280/63
(58) Field of Search ............................ 280/47.24, 42, 280/638, 35, 38, 40, 641, 645, 651, 652, 47.131, 47.17, 47.18, 47.19, 47.26, 47.34, 47.35, 79.2, 79.5, 79.6, 79.7

(56) References Cited

U.S. PATENT DOCUMENTS

| | | | | |
|---|---|---|---|---|
| 3,079,166 A | * | 2/1963 | Abgarian | 248/96 |
| 3,504,921 A | * | 4/1970 | Osmond | 224/329 |
| 3,531,136 A | * | 9/1970 | Mobley | 280/30 |
| 4,268,050 A | * | 5/1981 | Kennedy, Sr. | 224/324 |
| 4,318,567 A | * | 3/1982 | Guthier | 135/16 |
| 4,360,179 A | | 11/1982 | Roberts | |
| 4,865,346 A | * | 9/1989 | Carlile | 211/132.1 |
| 4,922,694 A | * | 5/1990 | Emoto | 172/17 |
| 5,092,112 A | * | 3/1992 | Buckendorf, Jr. | 56/12.7 |
| 5,111,800 A | | 5/1992 | Reynolds | |
| 5,152,489 A | * | 10/1992 | Christensen et al. | 211/14 |
| 5,340,153 A | * | 8/1994 | Parker | 280/47.17 |
| 5,358,108 A | * | 10/1994 | Celaya | 206/315.11 |
| 5,370,240 A | | 12/1994 | Hand | |
| 5,445,243 A | * | 8/1995 | Coffey et al. | 184/102 |
| 5,513,939 A | * | 5/1996 | Martin et al. | 280/47.24 |
| 5,564,527 A | * | 10/1996 | Coffey et al. | 184/102 |
| 5,582,419 A | * | 12/1996 | Lucia et al. | 280/42 |
| 5,678,740 A | * | 10/1997 | Wang | 224/274 |
| 5,678,842 A | * | 10/1997 | Hook et al. | 248/98 |
| 5,692,716 A | * | 12/1997 | Himmelsbach | 135/16 |
| 5,749,440 A | * | 5/1998 | Coffey et al. | 184/102 |
| 5,775,658 A | | 7/1998 | Englehardt | |
| 5,823,360 A | * | 10/1998 | Gorosave | 211/113 |
| 6,085,503 A | * | 7/2000 | Hutchinson | 248/230.1 |
| 6,131,556 A | | 10/2000 | Villarreal | |
| 6,131,917 A | * | 10/2000 | Walsh | 280/43.1 |
| 6,152,463 A | * | 11/2000 | Wu | 280/47.17 |
| 6,164,671 A | * | 12/2000 | Darling, III | 280/204 |
| 6,179,306 B1 | * | 1/2001 | Maxwell | 280/43.1 |
| 6,260,865 B1 | * | 7/2001 | Yacobi et al. | 248/346.01 |
| 6,409,131 B1 | * | 6/2002 | Bentley et al. | 248/219.4 |

OTHER PUBLICATIONS

API Outdoors, Inc.—The "Power Pak" ATV Bowholder brochure.
Merchant's School Sport Ltd—Equipment—Archery "Archery Storage Cart".

* cited by examiner

Primary Examiner—Brian L. Johnson
Assistant Examiner—Bridget Avery
(74) Attorney, Agent, or Firm—Thomas R. Shaffer, Esq.

(57) ABSTRACT

A pull cart for removably securing and transporting an elongate object. The pull cart includes a frame, a pair of spaced-apart wheels rotatably attached to the frame, a handle attached to the frame and an elongate object holder. The elongate object holder includes a first finger, a second finger and a third finger. The first finger and the second finger are arranged as a pair of spaced-apart fingers and are located on the opposite sides of the elongate object. The third finger is longitudinally spaced from the first finger and the second finger. The elongate object holder also includes a tension spring adapted to move at least one of the first finger and the second finger relatively closer to the elongate object so that the first finger, the second finger and the third finger are each in contact with the elongate object and the elongate object is removably held onto the pull cart. The pull cart is especially useful for transporting a bow on a 3D archery course or for transporting a rifle or a shotgun while hunting. A number of accessories may be attached to the pull cart.

20 Claims, 9 Drawing Sheets

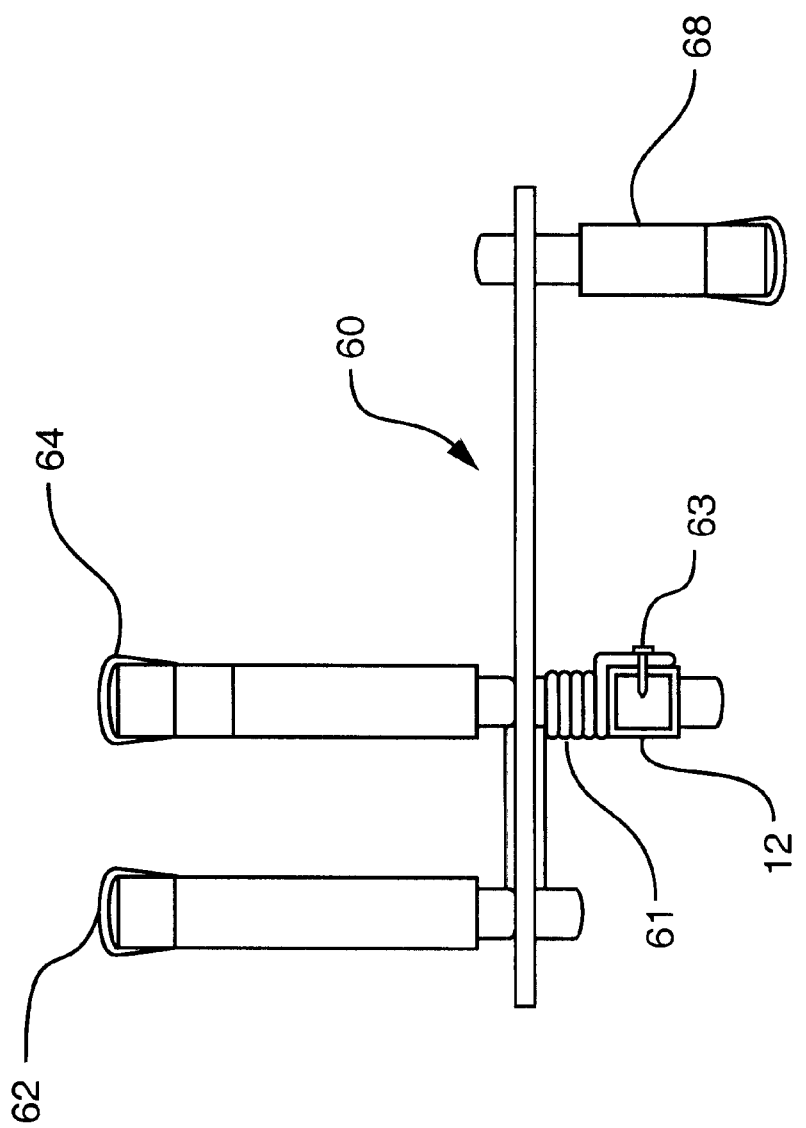

PULL CART

BACKGROUND OF THE INVENTION

I. Field of the Invention

The present invention relates to a pull cart for carrying an elongated object. More specifically, it relates to a pull cart used by sportsmen for carrying a bow or a rifle or the like together with additional gear over rough terrain.

II. Description of the Prior Art

Pull carts used by sportsmen are well known in the art. The most common form of a pull cart is a pull cart specifically designed for golfers which typically attach some form of golf bag (which may or may not contain a plurality of tubes adapted to receive the handles of various golf clubs). Such carts are well suited for golfers since golf clubs are readily accessible from the top of the golf bag by merely reaching into the bag and pulling the selected club out of the bag. Golf carts, however, in their present form, are not suitable for sportsmen who wish to carry a bow and arrows or a rifle or the like since such objects are not well suited to be stored in the same manner as golf clubs. More specifically, it is desirable to securely hold such sporting items in a desired location and preferably in such a location which is easily accessible in the event that the use of such object is quickly required.

Another problem with existing golf carts is that they are typically designed for use over smooth paths or well groomed golf courses and are not designed for use on rough terrain. Thus, there remains a need for a lightweight, durable, well-designed pull cart which can be used to carry elongate objects over rough terrain.

It is also known in the art to provide a bow holder which secures a bow to the cross members on the front rack of an ATV four-wheeler. Such known device utilizes a pair of spaced-apart fingers which are urged together by a bungee cord to hold the bow in place. Such a design, while useful for holding a bow onto an ATV has a number of disadvantages. One disadvantage is that the use of a bungee cord requires that the bungee cord be inspected regularly for dry rotting or deterioration. Another problem with the use of a bungee cord to hold the bow in place is that the bungee cord, being connected to both pairs of spaced-apart fingers requires an awkward manipulation of both pairs of fingers at the same time. Yet another problem with the use of a bungee cord is that it can easily get snagged of trees, bushes or other vegetation or objects in the woods. Once the bungee cord is broken, the product is unusable.

There remains a need for a bow holder device which is suitable for use on a pull cart which eliminates these problems.

SUMMARY OF THE INVENTION

The present invention solves these problems by providing a pull cart for carrying an elongate object which comprises a frame, a pair of spaced-apart wheels rotatably attached to the frame, a handle attached to the frame and an elongate object holder comprising a first finger, a second finger and a third finger. The first finger and second finger are arranged as a pair of spaced-apart fingers and are located on opposite sides of the elongated object. The third finger is longitudinally spaced from the first finger and second finger. The elongate object holder further comprises a tension means adapted to move at least one of the first finger and second finger relatively closer to the elongate object whereby the first finger, the second finger and the third finger are each in contact with said elongate object and said elongate object is removably held onto said pull cart.

Preferably, said first finger and said second finger are in contact with an upper portion of said elongate object and said third finger is in contact with a lower portion of said elongate object.

Also, said third finger is preferably in contact with an upper portion of said elongate object and said first finger and said second finger are in contact with a lower portion of said elongate object.

In one embodiment of the invention, said first finger and said second finger are mounted to a first arm member which is pivotally attached to said frame at a location between said first finger and said second finger.

In a preferred embodiment of the invention, said first finger and said second finger are mounted to a first arm member which is pivotally attached to said frame at a location of said first finger.

In another embodiment of the invention, said first finger and said second finger are mounted to a first arm member and said first finger is adapted to slide in a channel toward said second finger. Said channel is mounted to a frame at an angle greater than 0 degrees and less than 90 degrees relative to said elongate object. Said channel is preferably mounted to said frame at an angle approximately 45 degrees relative to said elongate object. In the preferred embodiment of the invention, said elongate object holder further comprises a fourth finger. Said first finger and said second finger are also preferably attached to a first arm member and said third finger and said fourth finger are attached to a second arm member. Preferably, an independent tension means is provided for said first arm member and for said second arm member. Said tension means is preferably in the form of a tension spring.

Said first finger and said second finger are preferably attached to a first arm member and wherein said arm member includes a first arm extension to hand grip and move said first arm member.

Further, said third finger and said fourth finger are preferably attached to a second arm member and wherein said second arm member includes a toe kick adapted to be operated by a foot of a user to move said second arm member.

The present invention also preferably provides one or more of the following accessory items: said handle includes an arrow grease tube;

Said handle includes a score card holder and pencil holder;

A gear box adapted to receive and hold a plurality of small objects;

Said first arm member further comprises an accessory eye hook adapted to hang objects onto the cart;

Said frame further comprises a water bottle holder and a water bottle;

Said frame further comprises a portable seat holding bracket;

Said frame further includes a binocular case holder;

Said frame member further comprises a quiver bracket and quiver for holding a plurality of arrows;

BRIEF DESCRIPTION OF THE FIGURES

FIG. 4 is a side elevational view of second arm member showing the third and fourth fingers of the present invention.

DETAILED DESCRIPTION OF THE PREFERRED EMBODIMENTS

Figure 1:
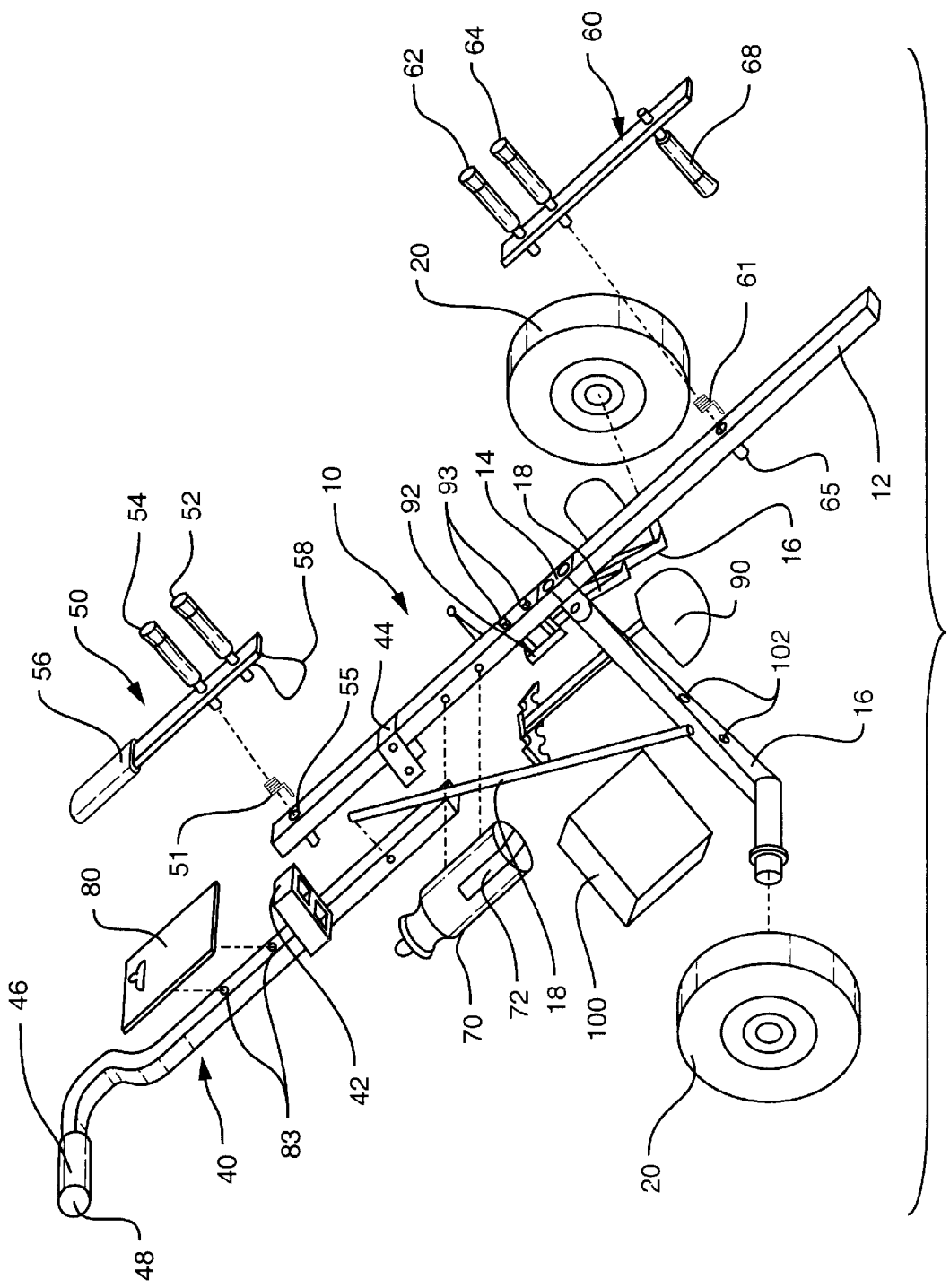
FIG. 1 is an isometric view, in exploded form of the preferred embodiment of the pull cart of the present invention.
Figure 2:
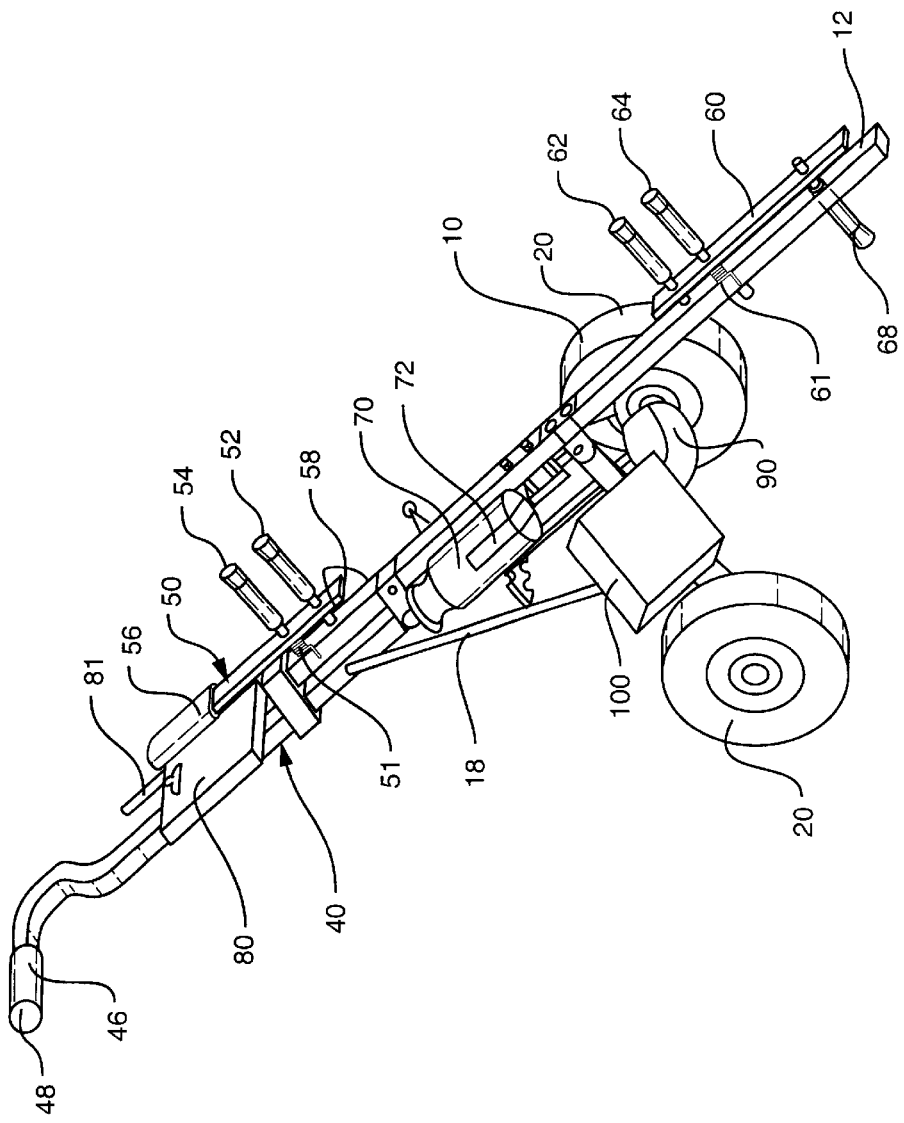
FIG. 2 is an isometric view of the pull cart of the present invention in assembled form.

Referring to FIGS. 1 and 2, the presently preferred embodiment of the present invention is shown. A pull cart includes a frame 10 consisting of a main beam 12. A pair of legs 16 are attached to main beam 12 by means of bracket 14. A pair of wheels 20 are mounted on legs 16. Preferably, wheels 20 are large inflated wheels so as to allow the pull cart to travel easily over rough terrain.

A pair of brace members 18 are provided to add stability to the leg members 16.

A handle 40 is attached to the frame 10 by means of brackets 42 and 44, as shown. Handle 40 includes a pull grip 46 and an opening 48 which allows for the greasing of arrows.

Figure 5:
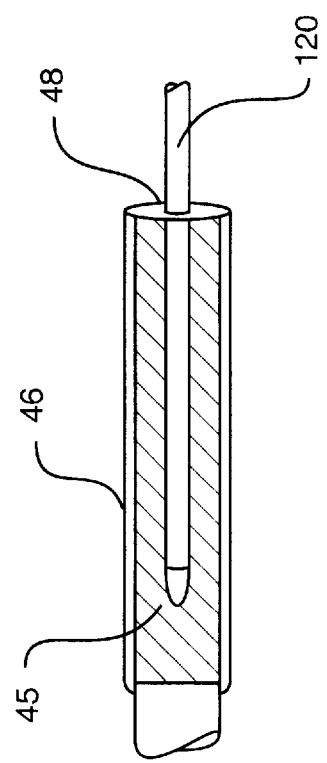
FIG. 5 is a cross-sectional view of the handle grip of the present invention showing an arrow grease tube.

Referring briefly to FIG. 5, the arrow grease tube is shown. More specifically, an arrow 120 may be inserted into opening 48 which passes into a styrofoam body 45 which is placed inside the handle 40 prior by applying the handle grip 46. The foam body 45 is presoaked prior to use with arrow grease thus allowing the tip of an arrow to be greased prior to shooting. This is particularly useful when an archer is utilizing a 3D target range course and allows arrows to be more easily removed from the 3D targets.

Referring back to FIGS. 1 and 2, a first arm member 50 is shown which includes a first finger 52, a second finger 54 an accessory eye hook 58 and a handle grip 56. A first arm member 50 is attached to frame 10 at location 55. A tension spring 51 is attached underneath finger 54 so as to apply a return tension onto the arm member 50 to urge it to be moved back to its resting position once it is moved from its resting position. The handle extension 56 may be moved by hand from the resting position by twisting the arm member 50 about its pivot point underneath finger 54 allowing the bow to be inserted into the upper arm 50.

Similarly, a second arm member 60 is shown which includes a third finger 62, and a fourth finger 64 and also including a toe kick 68. The lower second arm member 60 is pivotally attached to the frame 10 at location 65. A tension spring 61, which is mounted beneath finger 64, is utilized to provide reverse tension on the second arm member 60 once it is moved from its resting position causing it to want to return to its resting position once moved therefrom. In use, the user utilizes his or her foot on the toe kick 68 to move the second arm 60 from its initial resting position. Or, alternatively, one end of the bow may be inserted adjacent the third finger without moving the second arm member 60. Simultaneously, the user grips onto handle grip extension 56 of upper arm 50 to move it from its resting position. Once the bow (or rifle or other elongate object) is in position, the user releases pressure from his or her foot from the toe kick 68 and from the handle 56 and the springs 51 and 61 hold the elongate object firmly in place. It will be obvious to those skilled in the art that only three finger members and one spring member is needed to hold an object in place, but preferably four fingers and two springs are utilized.

Figure 3:
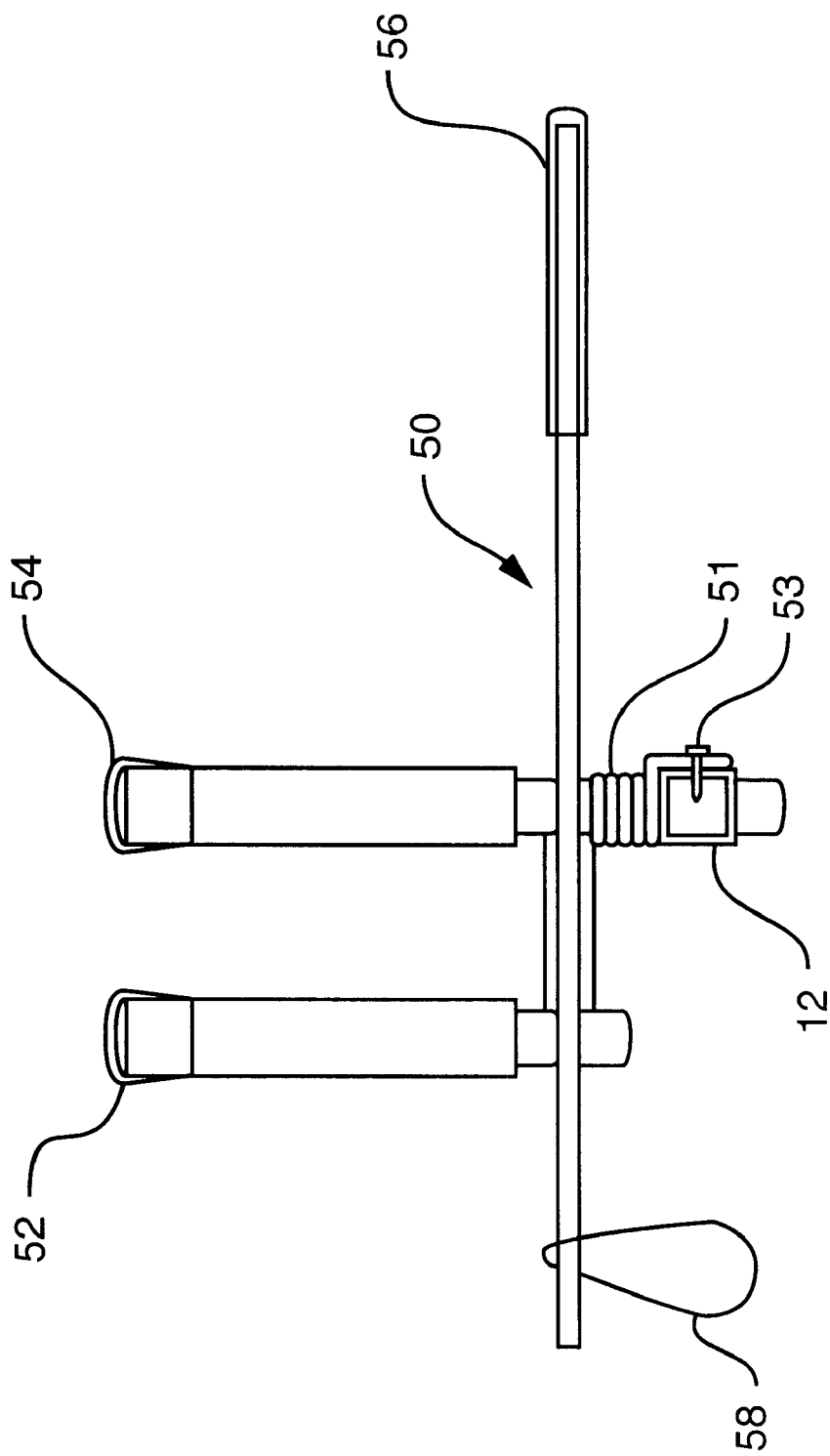
FIG. 3 is a side elevational view of the first arm member including the first and second finger members of the present invention.

As more clearly shown in FIG. 3, the spring 51 is held onto the main beam 12 of frame 10 by a screw 53. Similarly, referring to FIG. 4, a tension spring 61 is held onto main beam 12 of frame 10 by screw 63.

Figure 6:
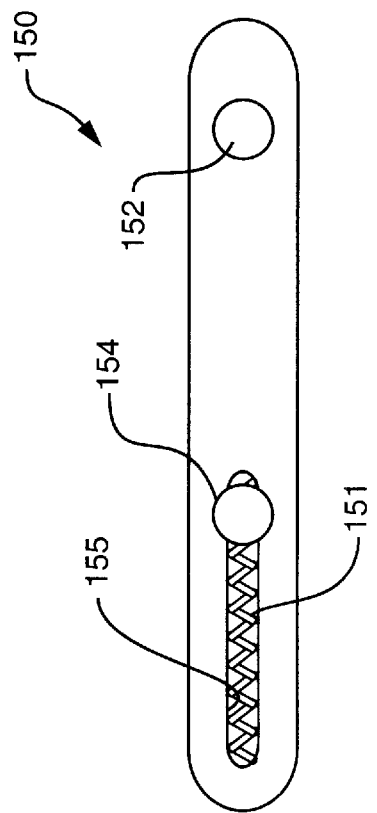
FIG. 6 is a top plan view of a second embodiment of the first arm member of the present invention.
Figure 7:
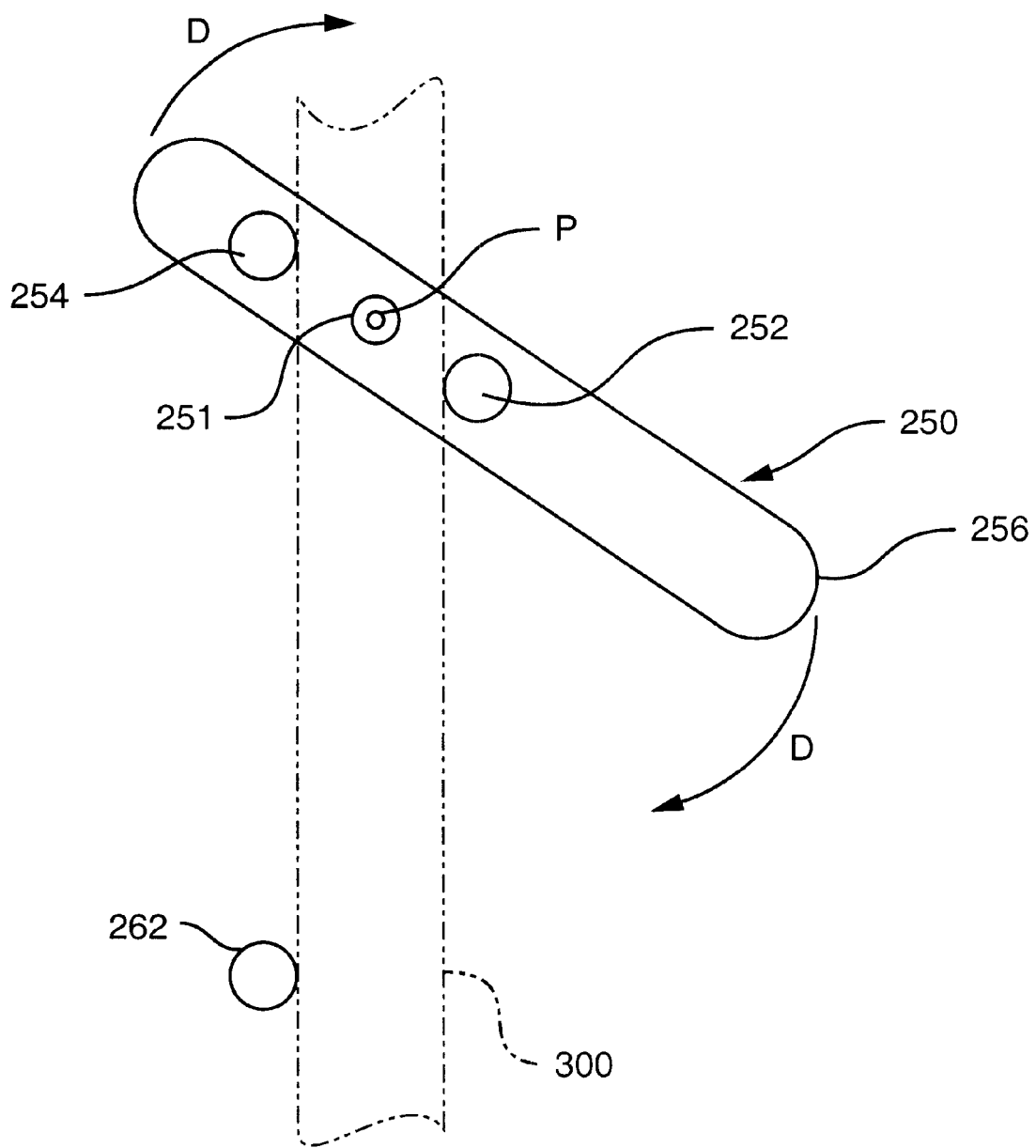
FIG. 7 is a third embodiment of the first arm member of the present invention.

Referring briefly to FIG. 6, a second embodiment of the first arm member is shown. In this Figure, first arm member 150 is provided with a first finger 152 which is stationary and fixed and a second finger 154 which is slidable in channel 155. A spring 151 is provided within channel 155 to urge finger 154 relatively closer to finger 152. The finger 154 may extend outwardly a greater distance than finger 152 so as to allow a user to grip finger 154 and physically move it away from finger 152 to insert an object between fingers 154 and 152. Obviously, a second arm member of the present invention may be adapted in a manner similar to that shown in FIG. 6 with a first arm member. Referring now to FIG. 7, a third embodiment of the first arm member of the present invention is shown. In this embodiment, first arm member 250 is pivotally mounted at point P to the frame. A first finger 252 and a second finger 254 are each fixed on arm member 250 at a location spaced from the pivot point P. A tension spring 251 is provided at the pivot point P to urge the arm member 250 to rotate in a clockwise direction as shown by arrows D. A handle extension 256 is provided for the user to hand grip. In use, a user grips handle 256, pulls it upwardly in the direction opposite of arrows D so as to allow an object, such as object 300 shown in dotted lines, to be placed between fingers 252 and 254. Upon release of the handle extension 256, the spring 251 causes the arm member 250 to rotate clockwise and the fingers 252 and 254 to grip the object 300 and to force a lower portion of object 300 firmly against a third finger 262 which is mounted to the frame.

Figure 8:
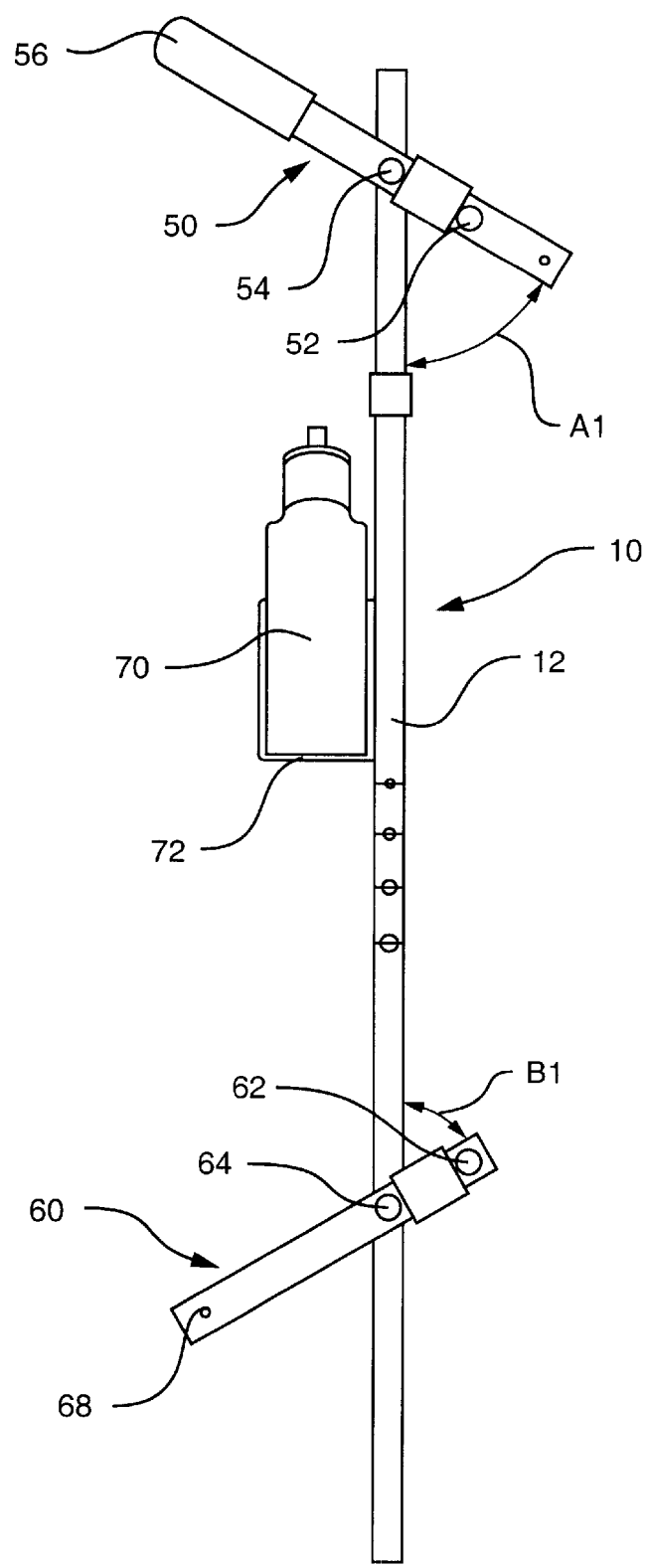
FIG. 8 is a top plan view of the arm members of the present invention in a resting position.

Referring briefly to FIG. 8, arm members 50 and 60 of the present invention are shown in a resting position. In the resting position, arm 50 is oriented at an angle A1, which is preferably 60°, relative to the main beam 12. Similarly, arm member 60 is positioned at an angle B1 relative to the main beam 12. Preferably, angle b1 is approximately 60° in a resting position.

Figure 9:
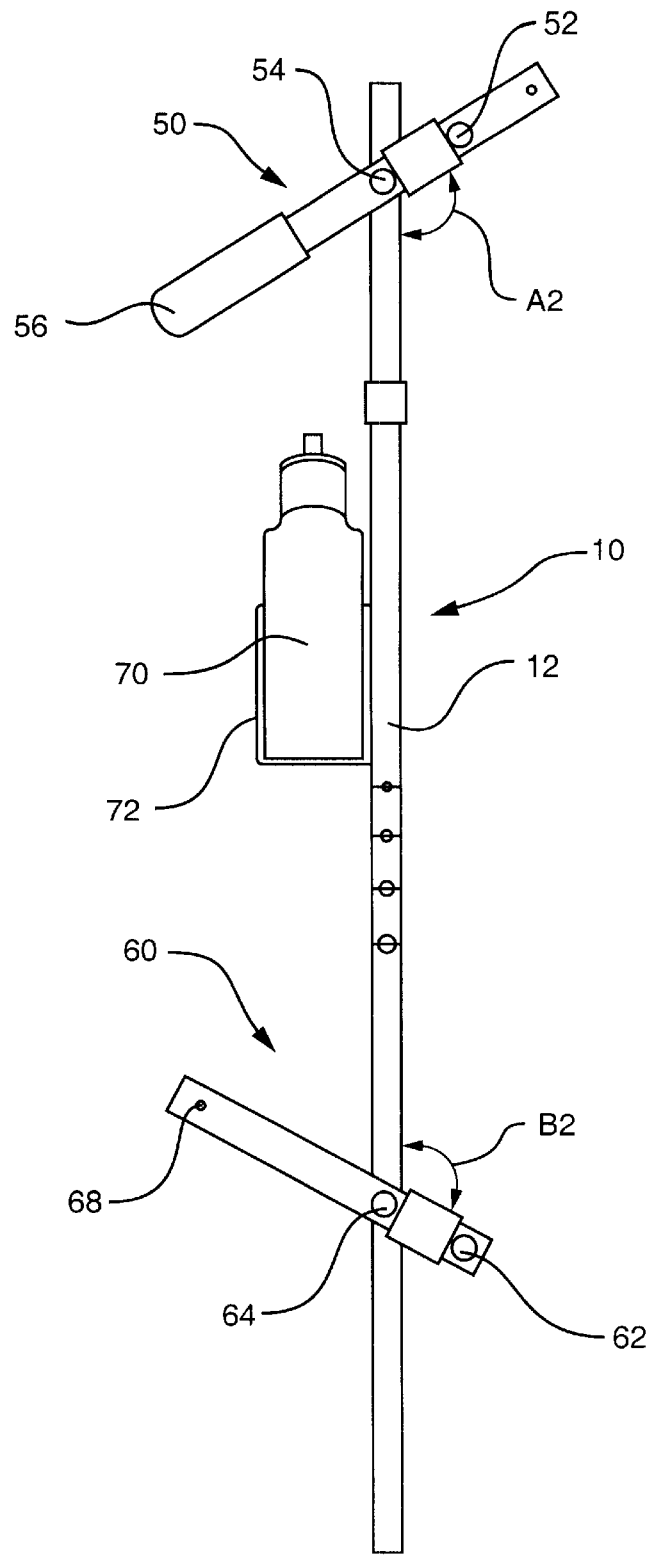
FIG. 9 is a top plan view of the arm members of the present invention in an open position.

Referring to FIG. 9, arm 50 and 60 are shown in an open position as urged by the hand and foot of the user, respectively. In this figure, the arm member 50 is preferably opened to an angle A2, which is preferably 120° relative to the main beam 12. Similarly, arm member 60 in an open position is preferably oriented at an angle B2 relative to the frame member 12. Angle b2 is preferably 120°.

Figure 10:
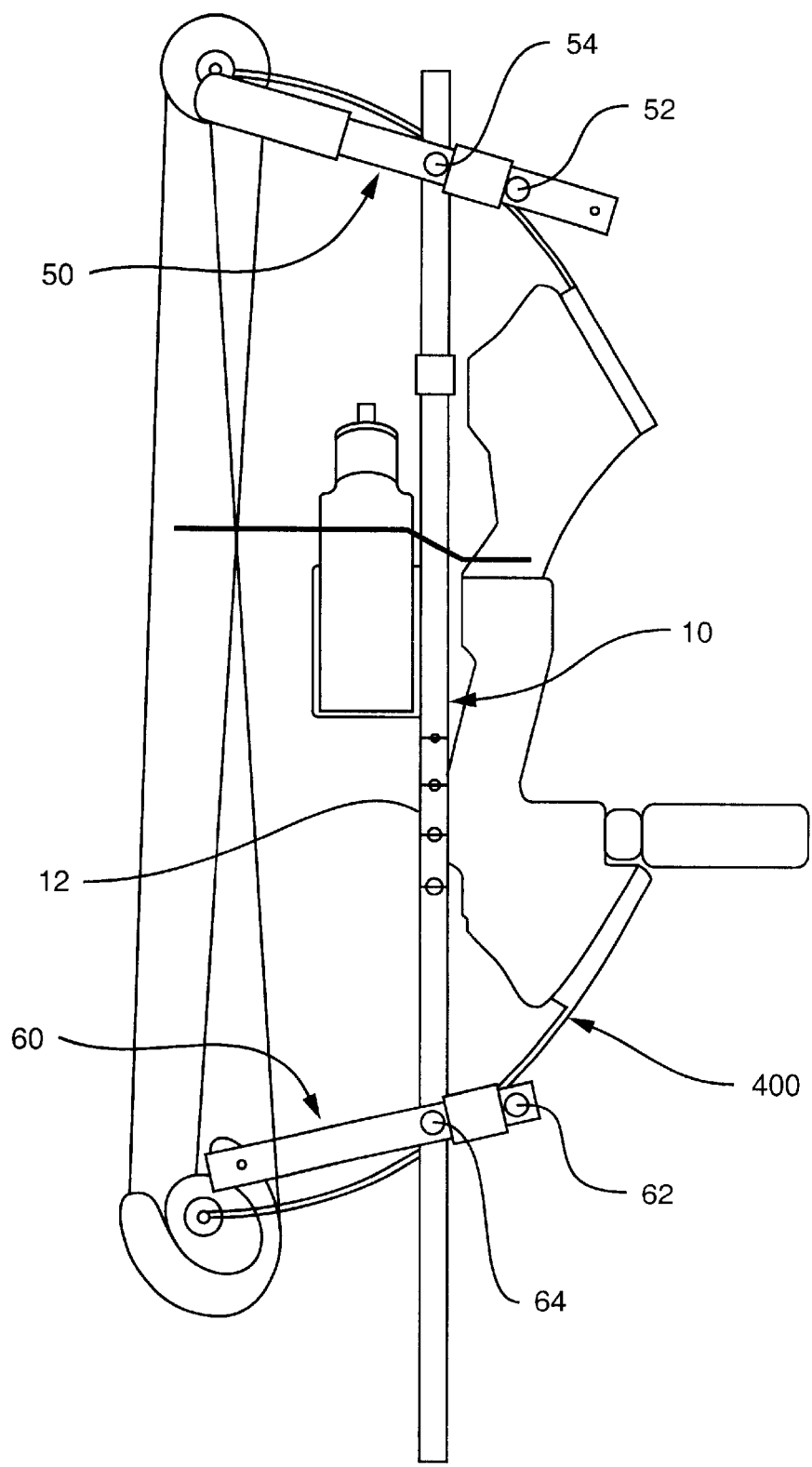
FIG. 10 is a top plan view of the arm members of the present invention holding a bow.

Referring to FIG. 10, a bow 400 is shown as removably secured by fingers 52 and 54 of arm member 50 and by fingers 62 and 64 of arm member 60.

Because of the single beam construction of the pull cart of the present invention which is preferably formed of tube steel or any suitable alloy of a strong light weight metal, the pull cart is extremely light weight and very well balanced and maneuverable over rough terrain.

As a convenience to the sportsmen utilizing the pull cart, the cart is designed to hold a number of accessories. By way of example, but not limiting the number of accessories that may be utilized with or attached to the pull cart of the present invention, a water bottle 70 may be secured by a bracket 72 into holes 73 of main beam 12.

Additionally, a binocular or other accessory case 100 may be attached by rivets to holes 102 of leg member 16. A pencil holder and scorecard holder 80 is adapted to be secured to handle 40 by screws or rivets at location 83.

A quiver 90 adapted to receive a plurality of arrows is mounted to a quiver bracket 92 which is attached to main beam 12 by bolt 93.

A large number of additional objects may be mounted onto the pull cart of the present invention depending upon the particular needs of the sportsmen involved. Some objects which are envisioned to be carried include a tripod seat, a stool tie down strap, fishing rod tube, a fishing tackle box/saddle bag, a shotgun shell saddle bag and an empty shell bag. It will be obvious to those skilled in the art that various types of additional accessories may be easily attached to the pull cart of the present invention.

While I have shown and described the presently preferred embodiment of our invention, the invention is not limited thereto and may be otherwise variously practiced within the scope of the following claims:

We claim:

1. A pull cart for carrying an elongate object comprising;
   a) a frame;
   b) a pair of spaced-apart wheels rotatably attached to said frames;
   c) a handle attached to said frame; and
   d) an elongate object holder comprising a first finger and a second finger attached to a first arm member, said first arm member pivotally attached to said frame and further comprising a third finger and a fourth finger attached to a second arm member, said second arm member also pivotally attached to said frame, said second arm further comprising a toe kick, said first finger and said second finger arranged as a first pair of spaced-apart fingers located on opposite sides of said elongate object and said third finger and said fourth finger arranged as a second pair of spaced-apart fingers located on opposite sides of said elongate object, said first arm member and said second arm member being longitudinally spaced-apart from one another, said elongate object holder further comprising tension means adapted to move at least one of said first finger and said second finger relatively closer to said elongate object and to move at least one of said third finger and said fourth finger relatively closer to said elongate object whereby said first finger, said second finger, said third finger and said fourth finger are each in contact with said elongate object and said elongate object is removably held onto said pull cart.

2. A pull cart according to claim 1 wherein said first finger and said second finger are in contact with an upper portion of said elongate object and said third finger and said fourth finger are in contact with a lower portion of said elongate object.

3. A pull cart according to claim 1 wherein said first arm member is pivotally attached to said frame at a location between said first finger and said second finger.

4. A pull cart according to claim 1 wherein said first arm member is pivotally attached to said frame at a location of said first finger.

5. A pull cart according to claim 1 wherein an independent tension means is provided for said first arm member and for said second arm member.

6. A pull cart according to claim 1 wherein said tension means comprises one of a tension springs and a bungee cord.

7. A pull cart according to claim 1 wherein said first finger and said second finger are attached to a first arm member and wherein said arm member includes a first arm extension to hand grip and move said first arm member.

8. A pull cart according to claim 1 wherein said handle includes a score card holder and pencil holder.

9. A pull cart according to claim 1 which further comprises a gear box adapted to receive and hold a plurality of small objects.

10. A pull cart according to claim 1 wherein said first finger and said second finger are mounted upon a first arm member and wherein said first arm member further comprises an accessory eye hook adapted to hang objects onto the cart.

11. A pull cart according to claim 1 wherein said frame further comprises a water bottle holder and a water bottle.

12. A pull cart according to claim 1 wherein said frame further comprises a portable seat holding bracket.

13. A pull cart according to claim 1 wherein said frame further includes a binocular case holder.

14. A pull cart according to claim 1 wherein said frame member further comprises a quiver bracket and quiver for holding a plurality of arrows.

15. A pull cart according to claim 1 wherein said elongate object is an archery bow.

16. A pull cart according to claim 1 wherein said elongate object is one of a rifle and a shotgun.

17. A pull cart according to claim 1 wherein said second arm member is pivotally attached to said frame at a location between said third finger and said fourth finger.

18. A pull cart according to claim 1 wherein said second arm member is pivotally attached to said frame at a location of said third finger.

19. A pull cart comprising:
   a) a frame;
   b) a pair of spaced-apart wheels rotatably attached to said frames;
   c) a handle attached to said frame; and
   d) an elongate object holder comprising a first finger, a second finger, a third finger and a fourth finger, said first finger and said second finger attached to a first arm member and said third finger and said fourth finger attached to a second arm member, said first finger and said second finger arranged as a first pair of spaced-apart fingers located on opposite sides of said elongate object and said third finger and said fourth finger arranged as a second pair of spaced-apart fingers located on opposite sides of said elongate object, said second pair of spaced-apart fingers longitudinally spaced from said first pair of spaced-apart fingers, said elongate object holder further comprising tension means adapted to move at least one of said first finger and said second finger relatively closer to said elongate object whereby said first finger, said second finger and said third finger are each in contact with said elongate object and said elongate object is removably held onto said pull cart, wherein said second arm member includes a toe kick adapted to be operated by a foot of a user to move said second arm member.

20. A pull cart comprising:
   a) a frame;
   b) a pair of spaced-apart wheels rotatably attached to said frames;
   c) a handle attached to said frame wherein said handle further comprises an arrow grease tube; and
   d) an elongate object holder comprising a first finger, a second finger, a third finger and a fourth finger, said first finger and said second finger attached to a first arm member and said third finger and said fourth finger attached to a second arm member, said first finger and said second finger arranged as a first pair of spaced-apart fingers located on opposite sides of said elongate object and said third finger and said fourth finger arranged as a second pair of spaced-apart fingers located on opposite sides of said elongate object, said second pair of spaced-apart fingers longitudinally spaced from said first pair of spaced-apart fingers, said elongate object holder further comprising tension means adapted to move at least one of said first finger and said second finger relatively closer to said elongate object whereby said first finger, said second finger and said third finger are each in contact with said elongate object and said elongate object is removably held onto said pull cart.

* * * * *